United States Patent
Korzhenko et al.

(10) Patent No.: US 10,208,180 B2
(45) Date of Patent: Feb. 19, 2019

(54) METHOD FOR PRODUCING A MASTER MIXTURE BASED ON CARBONACEOUS NANOFILLERS AND SUPER PLASTICISER, AND THE USE THEREOF IN HARDENABLE INORGANIC SYSTEMS

(71) Applicant: Arkema France, Colombes (FR)

(72) Inventors: Alexander Korzhenko, Pau (FR); Christophe Vincendeau, Lons (FR); Anna Lushnikova, Izhevsk (RU); Grigory Ivanovich Yakovlev, Izhevsk (RU); Grigoriy Nikolayevich Pervushin, Izhevsk (RU); Jean-Marc Suau, Lucenay (FR); David Platel, Saint Maurice de Gourdans (FR)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 15/819,626

(22) Filed: Nov. 21, 2017

(65) Prior Publication Data

US 2018/0148561 A1 May 31, 2018

Related U.S. Application Data

(62) Division of application No. 14/431,662, filed as application No. PCT/FR2013/052838 on Nov. 25, 2013, now Pat. No. 9,850,363.

(30) Foreign Application Priority Data

Nov. 26, 2012 (FR) ..................................... 12 61229

(51) Int. Cl.
| | | |
|---|---|---|
| *C04B 24/00* | (2006.01) | |
| *C08K 3/04* | (2006.01) | |
| *C04B 14/38* | (2006.01) | |
| *C04B 24/02* | (2006.01) | |
| *C04B 24/04* | (2006.01) | |
| *C04B 28/02* | (2006.01) | |
| *C09K 8/035* | (2006.01) | |
| *C04B 24/08* | (2006.01) | |

(52) U.S. Cl.
CPC .............. *C08K 3/04* (2013.01); *C04B 14/386* (2013.01); *C04B 24/02* (2013.01); *C04B 24/04* (2013.01); *C04B 24/08* (2013.01); *C04B 28/02* (2013.01); *C09K 8/035* (2013.01); *C08K 3/045* (2017.05)

(58) Field of Classification Search
CPC .................................................... C04B 14/386
See application file for complete search history.

(56) References Cited

U.S. PATENT DOCUMENTS

| 2008/0134942 A1 | 6/2008 | Brenner et al. |
| 2009/0229494 A1 | 9/2009 | Shah et al. |
| 2013/0276674 A1 | 10/2013 | Korzhenko et al. |

FOREIGN PATENT DOCUMENTS

| FR | 2 969 143 A1 | 6/2012 |
| RU | 2 267 004 C2 | 12/2005 |
| RU | 2 313 559 C2 | 12/2007 |
| WO | WO 03/002456 A2 | 1/2003 |
| WO | WO 2009/099640 A1 | 8/2009 |
| WO | WO 2012/085445 A1 | 6/2012 |

OTHER PUBLICATIONS

International Search Report (PCT/ISA/210) dated Jan. 16, 2014, by the France Patent Office as the International Searching Authority for International Application No. PCT/FR2013/052838.
Maria S. Konsta-Gdoutos et al., Cements & Concretes Composites, 32, (2010), pp. 110-115.
Arnon Chaipanich et al., "Compressive strength and microstructure of Carbon Nanotube-Fly Ash Cement Composites", Materials Science and Engineering A, 527, (2010), pp. 1063-1067.
Pervushin et al., Nanotechnology for green and sustainable construction international conference, Mar. 14-17, 2010, Cairo, Egypt, the whole book.
Emmanuel Flahaut et al., Chem. Com., (2003), 1442-1443.
Ignacio Martin-Gullon et al., Carbon, 44, (2006), pp. 1572-1580.

*Primary Examiner* — Vickey Nerangis
(74) *Attorney, Agent, or Firm* — Buchanan Ingersoll & Rooney P.C.

(57) ABSTRACT

Hardenable inorganic systems such as cements, plasters, ceramics or liquid silicates, usable for example in the building trade, construction industry or oil drilling industry. The insertion of carbonaceous nanofillers, such as carbon nanotubes, for reinforcing mechanical properties and improving such systems. A method for producing a master mixture including at least one superplasticiser and carbonaceous nanofillers at a mass ratio of between 0.1% and 25%, preferably between 0.2% and 20%, in relation to the total weight of the master mixture, and also to said master mixture thus obtained and to the use thereof in a hardenable inorganic system with a view to producing materials with improved properties. The disclosure applies to the construction industry, the building trade and the oil drilling industry.

11 Claims, 1 Drawing Sheet

METHOD FOR PRODUCING A MASTER MIXTURE BASED ON CARBONACEOUS NANOFILLERS AND SUPER PLASTICISER, AND THE USE THEREOF IN HARDENABLE INORGANIC SYSTEMS

CROSS REFERENCE TO RELATED APPLICATIONS

The present application is a divisional of U.S. application Ser. No. 14/431,662, filed on Mar. 26, 2015, which is a U.S. national stage application of International Application No. PCT/FR2013/052838, filed on Nov. 25, 2013, which claims the benefit of French Application No. 1261229, filed on Nov. 26, 2012. The entire contents of each of U.S. application Ser. No. 14/431,662, International Application No. PCT/FR2013/052838, and French Application No. 1261229 are hereby incorporated herein by reference in their entirety.

TECHNICAL FIELD

The present invention relates to curable inorganic systems, such as cements, plasters, ceramics or liquid silicates, which can be used, for example, in the fields of building, construction or the oil drilling industry.

The invention relates more particularly to the use of carbon-based nanofillers, such as carbon nanotubes, for reinforcing the mechanical properties and improving such systems.

The invention relates to a process for the preparation of a master batch based on carbon-based nanofillers and a super plasticizer, to said master batch thus obtained and to its use in a curable inorganic system for the purpose of preparing materials having improved properties.

The invention applies to the fields of construction, building or drilling for oil.

TECHNICAL BACKGROUND AND TECHNICAL PROBLEM

Cement-based concrete remains the most widely employed material in construction. Despite the existence of solutions such as incorporation of metal reinforcements, there always exists a need to improve the properties of concretes, whether their mechanical strength, their resistance to aging or the control of the process of hydration of the cement forming the basis of concretes.

It has been demonstrated in preceding studies that the incorporation of carbon nanotubes in cements exhibits numerous advantages. This is because carbon nanotubes (or CNTs) confer improved mechanical properties and electrical and/or thermal conduction properties on any composite material in which they are present; in particular, their good mechanical properties and in particular their good properties of resistance to elongation are related in part to their very high aspect (length/diameter) ratios.

By way of example, in the document US 2008/0134942, the addition of carbon nanotubes at a content of greater than 0.2%, combined with the addition of small contents of a plasticizer, makes it possible to reinforce cements in terms of resistance to compression and to deformation.

The document WO 2009/099640 describes a method for the preparation of materials based on reinforced cement which consists in dispersing carbon nanotubes in a surfactant solution, in a surfactant/CNTs ratio of between 1.5 and 8, using ultrasound, and then mixing the dispersion with a cement, so as to obtain a material comprising 0.02% to 0.1% of carbon nanotubes with respect to the cement. The carbon nanotubes employed preferably have a diameter ranging from 20 to 40 nm and a length ranging from 10 to 100 μm. The surfactants are preferably polycarboxylate-based superplasticizers. The CNT dispersion comprises more than 98% of water and a low content of superplasticizer, generally of less than 1%. This dispersion is generally used rapidly after its preparation and is not stored. According to this document, the quality of the dispersion of the CNTs within the material results from the quality of the dispersion of the CNTs in the surfactant solution obtained by ultrasound. The effects obtained are the increase in the Young's modulus and in the bending strength and also a reduction in the phenomenon of endogenous shrinkage.

Similar results with regard to the effects of carbon nanotubes as cement reinforcer are described in the document Cements & Concretes Composites, 32 (2010), 110-150.

According to the document Materials Science and Engineering A, 527, (2010) 1063-1067, the mechanical reinforcement resulting from the presence of the carbon nanotubes is also accompanied by the densification of the cement.

Pervushin et al. have presented, at the Nano-technology for green and sustainable construction international conference, 14-17 Mar. 2010, in Cairo, Egypt, the results obtained on the reinforcing of cement by virtue of the incorporation of carbon nanotubes at contents as low as 0.006% with respect to the cement, in the form of an aqueous dispersion obtained by hydrodynamic cavitation starting from powdered CNTs and a superplasticizer. However, this study shows that these CNT dispersions are not stable over time and thus have to be used rapidly for the cement reinforcing application; in addition, as the CNTs are generally provided in the form of agglomerated powder grains, the mean dimensions of which are of the order of a few hundred microns, the handling thereof may present safety problems due to their pulverulent nature and their ability to generate fines in the plants where they are used.

In patent application WO 2012/085445, provision has been made to introduce, into the curable inorganic system, carbon nanotubes not in the powder form but in the form of a master batch of carbon nanotubes comprising a polymer binder. The process consists in preparing a dispersion in water of carbon-based nanofillers starting from a master batch of carbon-based nanofillers and of a polymer binder, in the presence of at least one superplasticizer, and in subjecting this dispersion to a treatment by high-speed mixing, for example by sonication, by cavitation of the fluids or using a Silverson high shear mixer or a bead mill. The dispersion is introduced, as is or rediluted, into a curable inorganic system, such as a cement, to ensure a final content of carbon-based nanofillers ranging from 0.001% to 0.02% by weight, preferably from 0.005% to 0.01%, with respect to the curable inorganic system. According to this process, the procedure for the dispersion still remains lengthy and difficult to carry out on a greater scale, and the composite material obtained, such as a concrete, comprises a low content of a polymer binder, which may possibly affect the properties thereof.

Consequently, the introduction of carbon nanotubes into cement-based materials or any other curable inorganic system still raises a few negative points which have to be improved.

It is therefore desirable to have available a means which makes it possible to simply and homogeneously distribute carbon nanotubes within a cement-based material or any other curable inorganic system for the purpose of preparing composite materials of high mechanical strength and preventing the cracks resulting from the aging of these materials.

Furthermore, due to their pulverulent nature and their ability to generate fines in manufacturing plants, it is preferable to be able to work with CNTs in agglomerated solid form of macroscopic size.

The applicant company has discovered that these requirements could be met by introducing carbon nanotubes into cement-based materials or any other curable inorganic system via a master batch based on carbon nanotubes and on a superplasticizer. This is because the use of a superplasticizer is always recommended in order to increase the compactness and the mechanical strength of concretes and mortars and to improve their fluidity and their handling.

The present invention thus consists in replacing the superplasticizer with a superplasticizer doped with carbon nanotubes in the existing manufacturing processes and devices of the building and construction industry and also in the oil field.

The process of the introduction of the carbon nanotubes according to the present invention is simple, fast and easy to carry out from an industrial viewpoint while observing the constraints of health and safety. It does not require modifying the conventional processes for the manufacture of composite materials based on curable inorganic systems which already use a superplasticizer as high water-reducing dispersing additive, while resulting in materials which are denser and mechanically reinforced.

Furthermore, it is apparent to the applicant company that this invention can also be applied to other carbon-based nanofillers than carbon nanotubes and in particular to carbon nanofibers and to graphenes.

SUMMARY

A subject matter of the present invention is thus a process for the preparation of a master batch comprising at least one superplasticizer and from 0.1% to 25% of carbon-based nanofillers, expressed with respect to the total weight of the master batch, comprising:

(i) the introduction into a kneader and then the kneading of carbon-based nanofillers and of at least one superplasticizer, optionally in the presence of a water-soluble dispersing agent, in order to form a homogeneous mixture in the solid form or in the pasty composition form;

(ii) the extrusion of said mixture in the solid form in order to obtain a master batch in the solid form;

(iii) optionally the dispersion of said master batch in the solid form in a superplasticizer identical to or different from that of stage (i), or in a water-soluble dispersant, in order to obtain a master batch in the form of a pasty composition;

(iv) optionally the introduction of the master batch in the form of a pasty composition obtained in stage (i) or in stage (iii), into a superplasticizer which is identical to or different from that of stage (i) or that of stage (iii), in order to obtain a master batch having a low content of carbon-based nanofillers.

According to one embodiment of the process according to the invention, stage (i) results directly in the preparation of a master batch in the form of a pasty composition, it being possible for said process to additionally directly comprise stage (iv), in order to obtain a master batch having a low content of carbon-based nanofillers.

The invention also relates to a master batch comprising at least one superplasticizer and carbon-based nanofillers at a content by weight of between 0.1% and 25%, preferably between 0.2% and 20%, with respect to the total weight of the master batch, capable of being obtained according to said process.

Another subject matter of the invention is a process for the introduction of carbon-based nanofillers into a curable inorganic system, comprising at least the stage of introduction of water and of a master batch as described above, separately or as a mixture, into a kneading appliance comprising at least one curable inorganic system, in order to ensure a content of carbon-based nanofillers ranging from 0.0001% to 0.02% by weight, preferably from 0.0005% to 0.01% by weight, with respect to the curable inorganic system, and a water/curable inorganic system ratio by weight ranging from 0.2 to 1.5 and preferably from 0.2 to 0.7.

The invention also relates to the composite materials based on curable inorganic systems capable of being obtained according to this process and to their uses in the field of construction and building, for preparing mortars for bricklaying or interior and exterior coatings or for manufacturing structural construction products, and in the field of the oil industry, for drilling applications.

Another subject matter of the invention is the use of a master batch based on at least one superplasticizer and on 0.1% to 25% by weight of carbon-based nanofillers, with respect to the total weight of the master batch, for improving the resistance to freezing and to the diffusion of liquid of a curable inorganic system, such as a cement, or for improving the adhesion between a curable inorganic system and metal or nonmetal reinforcements or reinforcers in the form of mineral fibers or reinforcers based on polymers, in structural construction products, or for reducing the phenomena of microcracking due to the various stresses in structural construction products.

DETAILED DESCRIPTION

The invention relates to the field of curable inorganic systems, that is to say inorganic materials, such as cement bases, which, after mixing with water, cure equally well in air as in water. The agglomerates of these materials which result therefrom, such as concretes, withstand water and exhibit a compressive strength.

Any type of cement base as described in the standard EN-197-1-2000 is especially concerned, in particular Portland-type cement, composite Portland cement, for example with limestone, with slag, with fly ash, with pozzolana, with calcined shale or with silica fume, blast furnace cement, pozzolanic cement, magnesia cement, or other anhydrite-based cement, such as fluoroanhydrite cement, used alone or as a mixture, which constitute concretes, but also materials such as gypsum, which forms the basis for plasters, or ordinary lime.

The invention can also be applied to inorganic materials, such as liquid silicates and ceramics, which cure with heat at high temperature.

Preferably, the curable inorganic system is a cement base and, for this reason, the detailed description will refer essentially to cement and to concrete, for reasons of simplicity, it being understood that the invention is not under any circumstances limited to this type of curable inorganic system.

The Carbon-based Nanofillers

In the continuation of this description, the term "carbon-based nanofiller" denotes a filler comprising at least one component from the group formed of carbon nanotubes, carbon nanofibers and graphenes, or a mixture of these in all proportions. According to the invention, it is preferable to use carbon nanotubes as carbon-based nanofillers, alone or as a mixture with graphenes.

The carbon nanotubes participating in the composition of the master batch can be of the single-walled, double-walled or multi-walled type. The double-walled nanotubes can in particular be prepared as described by Flahaut et al. in Chem. Com. (2003), 1442. For their part, the multi-walled nanotubes can be prepared as described in the document WO 03/02456.

The carbon nanotubes employed according to the invention usually have a mean diameter ranging from 0.1 to 200 nm, preferably from 0.1 to 100 nm, more preferably from 0.4 to 50 nm and better still from 1 to 30 nm, indeed even from 10 to 15 nm, and advantageously a length of more than 0.1 µm and advantageously from 0.1 to 20 µm, preferably 0.1 to 10 µm, for example of approximately 6 µm. Their length/diameter ratio is advantageously greater than 10 and generally greater than 100. These nanotubes thus comprise in particular "VGCF" (Vapor Grown Carbon Fibers) nanotubes. Their specific surface is, for example, between 100 and 300 $m^2/g$, advantageously between 200 and 300 $m^2/g$, and their bulk density can in particular be between 0.01 and 0.5 $g/cm^3$ and more preferably between 0.07 and 0.2 $g/cm^3$. The multi-walled carbon nanotubes can, for example, comprise from 5 to 15 sheets and more preferably from 7 to 10 sheets.

These nanotubes may or may not be treated.

An example of crude carbon nanotubes is in particular the trade name Graphistrength® C100 from Arkema.

These nanotubes can be purified and/or treated (for example oxidized) and/or ground and/or functionalized.

The grinding of the nanotubes can in particular be carried out under cold conditions or under hot conditions and can be carried out according to the known techniques employed in devices such as ball mills, hammer mills, edge runner mills, knife mills, gas jet mills or any other grinding system capable of reducing the size of the entangled network of nanotubes. It is preferable for this grinding stage to be carried out according to a gas jet grinding technique and in particular in an air jet mill.

The crude or ground nanotubes can be purified by washing with a sulfuric acid solution so as to free them from possible residual inorganic and metallic impurities, such as, for example, iron, originating from their process of preparation. The ratio by weight of the nanotubes to the sulfuric acid can in particular be between 1:2 and 1:3. The purification operation can furthermore be carried out at a temperature ranging from 90 to 120'C, for example for a period of time of 5 to 10 hours. This operation can advantageously be followed by stages of rinsing with water and of drying the purified nanotubes. In an alternative form, the nanotubes can be purified by heat treatment at a high temperature, typically of greater than 1000° C.

The nanotubes are advantageously oxidized by being brought into contact with a sodium hypochlorite solution including from 0.5 to 15% by weight of NaOCl and preferably from 1 to 10% by weight of NaOCl, for example in a ratio by weight of the nanotubes to the sodium hypochlorite ranging from 1:0.1 to 1:1. Oxidation is advantageously carried out at a temperature of less than 60° C. and preferably at ambient temperature, for a period of time ranging from a few minutes to 24 hours. This oxidation operation can advantageously be followed by stages of filtering and/or centrifuging, washing and drying the oxidized nanotubes.

The nanotubes can be functionalized by grafting reactive units, such as vinyl monomers, to the surface of the nanotubes. The constituent material of the nanotubes is used as radical polymerization initiator after having been subjected to a heat treatment at more than 900° C., in an anhydrous and oxygen-free environment, which is intended to remove the oxygen-comprising groups from its surface. It is thus possible to polymerize methyl methacrylate or hydroxyethyl methacrylate at the surface of carbon nanotubes.

Use is preferably made, in the present invention, of crude carbon nanotubes which are optionally ground, that is to say nanotubes which are neither oxidized nor purified nor functionalized and which have not been subjected to any other chemical and/or heat treatment.

The carbon nanofibers are, like the carbon nanotubes, nanofilaments produced by chemical vapor deposition (or CVD) from a carbon-based source which is decomposed on a catalyst comprising a transition metal (Fe, Ni, Co, Cu), in the presence of hydrogen, at temperatures from 500 to 1200° C. However, these two carbon-based fillers differ in their structure (I. Martin-Gullon et al., Carbon, 44 (2006), 1572-1580). This is because carbon nanotubes consist of one or more graphene sheets wound concentrically around the axis of the fiber to form a cylinder having a diameter of 10 to 100 nm. In contrast, carbon nanofibers are composed of relatively organized graphitic regions (or turbostratic stacks), the planes of which are inclined at variable angles with respect to the axis of the fiber. These stacks can take the form of platelets, fishbones or dishes stacked in order to form structures having a diameter generally ranging from 100 nm to 500 nm, indeed even more.

Preference is furthermore given to the use of carbon nanofibers having a diameter from 100 to 200 nm, for example of approximately 150 nm (VGCF® from Showa Denko), and advantageously a length from 100 to 200 µm.

The term "graphene" denotes a flat, isolated and separate graphite sheet but also, by extension, an assemblage comprising between 1 and a few tens of sheets and exhibiting a flat or more or less undulating structure. This definition thus encompasses FLGs (Few Layer Graphene), NGPs (Nanosized Graphene Plates), CNSs (Carbon NanoSheets) and GNRs (Graphene NanoRibbons). On the other hand, it excludes carbon nanotubes and nanofibers, which are respectively composed of the coaxial winding of one or more graphene sheets and of the turbostratic stacking of these sheets. Furthermore, it is preferable for the graphene used according to the invention not to be subjected to an additional stage of chemical oxidation or of functionalization.

The graphene used according to the invention is obtained by chemical vapor deposition or CVD, preferably according to a process using a pulverulent catalyst based on a mixed oxide. It is characteristically provided in the form of particles with a thickness of less than 50 nm, preferably of less than 15 nm, more preferably of less than 5 nm, and with lateral dimensions of less than a micron, preferably from 10 nm to less than 1000 nm, more preferably from 50 to 600 nm, indeed even from 100 to 400 nm. Each of these particles generally contains from 1 to 50 sheets, preferably from 1 to 20 sheets and more preferably from 1 to 10 sheets, indeed even from 1 to 5 sheets, which are capable of being separated from one another in the form of independent sheets, for example during a treatment by ultrasound.

The Superplasticizers

The use of high water-reducing superplasticizers makes it possible to reduce the water of the concrete at equal consistency, resulting in the suppression of a large volume not mobilized by the water necessary for the hydration of the cement. The addition of a superplasticizer at a level of 1% to 2% of the weight of cement makes it possible to significantly reduce the volume of water necessary. The presence of a superplasticizer thus makes it possible to increase the compactness and the mechanical strength of concretes and mortars, while improving their fluidity and their processing. Thus, the content of superplasticizer will be adjusted as a function of the final use of the curable inorganic system; for example, in the case of fluid cement-based concrete intended for injections, the content of superplasticizer will be greater in order to render the concrete pumpable.

Due to the properties introduced during the use of a superplasticizer, these products have now become essential in the fields of construction, building and oil drilling operations.

Mention may be made, as examples of superplasticizer which can be used, of:

sulfonated salts of polycondensates of naphthalene and formaldehyde, commonly known as polynaphthalene-sulfonates or naphthalene-based superplasticizers;
  sulfonated salts of polycondensates of melamine and formaldehyde, commonly known as melamine-based superplasticizers;
  lignosulfonates having very low sugar contents;
  polyacrylates;
  products based on polycarboxylic acids, in particular polyether polycarboxylate salts;
  and their corresponding aqueous solutions.

Use is made in particular of naphthalene-based superplasticizers, such as the condensation products of naphthalene-sulfonic acid with formaldehyde, which comprise oligomers of naphthalene methyl sulfonate and sodium naphthalene-sulfonate, or superplasticizers of the family of modified sodium lignosulfonates, or of the family of polycarboxylic acids, in particular polyether polycarboxylate salts, or also the family of acrylic copolymers.

Use may be made, for example, of the commercial products Megalit C-3, Superplast C-3 or Polyplast SP-1, the products of the Ethacryl range or the product XP 1824 from Coatex.

The superplasticizers are generally commercially available in the form of a more or less viscous aqueous solution having a more or less high viscosity.

The Master Batch

According to the present invention, the term "master batch" refers to a matrix of at least one superplasticizer in which carbon-based nanofillers are dispersed at contents ranging from 0.1% to 25%, preferably from 0.2% to 20%, with respect to the total weight of the master batch, the physical appearance of the master batch varying according to the content of carbon-based nanofillers.

A master batch comprising from 0.1% to 1% of carbon-based nanofillers can be compared to a superplasticizer doped with carbon-based nanofillers.

Thus, a master batch in the solid form generally comprises from 10% to 25% of carbon-based nanofillers; in this case, the solids content, except for the content of carbon-based nanofillers, is generally between 30% and 40%.

A master batch in the pasty composition form generally comprises from 2% to 10% of carbon-based nanofillers. The master batches having a low content of carbon-based nanofillers, from 0.1% to 2%, are generally provided in the form of viscous liquids.

The master batches in the paste or viscous liquid form, comprising from 0.1% to approximately 10% of carbon-based nanofillers, exhibit a solids content, except for the content of carbon-based nanofillers, generally of between 30% and 50%, preferably between 35% and 40%.

The term "pasty composition" is understood to mean a composition exhibiting a Brookfield viscosity ranging from 100 to 25000 mPa·s, preferably ranging from 400 to 15000 mPa·s.

The master batch can additionally comprise a water-soluble dispersing agent used to improve the dispersion of carbon-based nanofillers and also the stability thereof over time.

The term "water-soluble dispersing agent" is understood to mean, within the meaning of the present invention, a compound which makes possible a homogeneous dispersion of the nanofillers in the superplasticizer, without resulting in an excessively high viscosity during its preparation, and also the reduction in the forming effect during the mixing stages. It is a rheology-modifying additive exhibiting antifoaming properties.

The water-soluble dispersing agent according to the invention is bonded to the nanofillers, either covalently or noncovalently.

In the case where the water-soluble dispersing agent is noncovalently bonded to the nanofillers, it can be chosen from essential nonionic surfactants.

The term "essentially nonionic surfactant" is understood to mean, within the meaning of the present invention, a nonionic amphiphilic compound, for example mentioned in the work McCutcheon's, 2008, "Emulsifiers and Detergents", and preferably having an HLB (hydrophilic/lipophilic balance) of 13 to 16, and also block copolymers including hydrophilic blocks and lipophilic blocks and exhibiting a low ionicity, for example 0% to 10% by weight of ionic monomer and 90% to 100% of nonionic monomer.

For example, in the context of the present invention, the water-soluble dispersants noncovalently bonded to the nanofillers can be chosen from:

(i) esters of polyols, in particular:
  esters of fatty acid and of sorbitan, which are optionally polyethoxylated, for example surfactants of the Tween® family,
  esters of fatty acids and of glycerol,
  esters of fatty acids and of sucrose,
  esters of fatty acids and of polyethylene glycol,
  (ii) polysiloxanes modified by polyethers,
  (iii) ethers of fatty alcohols and of polyethylene glycol, for example surfactants of the Brij® family,
  (iv) alkyl polyglycosides,
  (v) polyethylene/polyethylene glycol block copolymers.

In the second case, when the water-soluble dispersing agent is covalently bonded to the nanofillers, it is preferably a hydrophilic group, advantageously a polyethylene glycol group, grafted to the nanofillers.

Mention may be made, as examples of commercial products which can be used, of the wetting and dispersing agent Tego® 750 W from Evonik or the additive Rhealis™ DFoam sold by Coatex.

Process for the Preparation of the Master Batch According to the Invention

The master batch can be prepared in a single stage (i), by kneading carbon-based nanofillers in a kneader with at least one superplasticizer, optionally in the presence of a water-soluble dispersing agent.

According to a first embodiment of the invention, the master batch is concentrated and solid and can be shaped by extrusion (stage (ii)), in order to be used directly in the application envisaged, or redispersed in at least one superplasticizer, identical to or different from the preceding one, (stage (iii)), in order to form a master batch in the paste form comprising a lower content of carbon-based nanofillers. According to this embodiment, it is also possible to redisperse the solid master batch in a water-soluble dispersing agent, which makes it possible to avoid problems of forming and of excessively high viscosity during this stage.

According to a second embodiment of the invention, the master batch obtained in stage (i) is provided directly in the paste form.

Advantageously, the master batch in the pasty composition form is redispersed in at least one superplasticizer, resulting in a superplasticizer (or mixture of superplasticizers) doped with carbon-based nanofillers (stage (iv)). This procedure makes it possible to achieve relatively low contents, for example from 0.1% to 1%, of carbon-based nanofillers which are completely and homogeneously dispersed in the superplasticizer, which can be used in a comparable fashion to a superplasticizer not comprising carbon-based nanofillers.

It is therefore not necessary to adapt the method of introduction of the doped superplasticizer in current processes for the preparation of concrete.

One embodiment of stage (i) consists in carrying out the kneading of the mixture by the compounding route, advantageously using a corotating or counterrotating twin-screw extruder or using a co-kneader (in particular of Buss® type) comprising a rotor provided with flights adapted to interact with teeth mounted on a stator. The kneading can be carried out at a temperature preferably of between 20° C. and 90° C.

In order to obtain the paste directly, it is possible to predisperse the nanofillers, for example using a deflocculator, and then to use a bead mill, resulting in the production of a completely homogeneous dispersion.

Stage (iii) can be carried out using a paddle mixer, in order to obtain a homogeneous dispersion, followed by passing through a bead mill, in order to produce a mixture not exhibiting particles with a size of greater than 10 µm.

Stage (iv) is carried out simply under normal stirring, for example using a paddle mixer or a low-speed mechanical mixer.

Preferably, a superplasticizer of the same nature is used in the different stages of the preparation process.

A subject matter of the invention is the master batch capable of being thus obtained according to the different alternative forms of the preparation process and comprising carbon-based nanofillers at a content by weight of between 0.1% and 25%, preferably between 0.2% and 20%, or ranging from 0.1% to 1%, with respect to the total weight of the master batch, it being possible for said master batch to additionally comprise a water-soluble dispersant as defined above.

Use of the Master Batch to Introduce Carbon-based Nanofillers

The process for the introduction of carbon-based nanofillers into the cement according to the invention consists in introducing, with conventional devices, the master batch and the water which will be used during the mixing operation, separately or as a mixture, directly into the kneading appliance, such as a concrete mixer, comprising the cement.

The curable inorganic system, such as cement, is generally mixed beforehand with a material, such as sand, in a cement/sand ratio of the order of 1:3. Without the applicant company being committed to any one theory, it believes that the presence of the carbon-based nanofillers facilitates the formation of an interfacial layer between the sand and the cement; consequently, the interfaces become more compact and reduce the appearance of cracks and crevices.

According to one embodiment of the invention, the curable inorganic system, such as a cement, is mixed beforehand under dry conditions with hollow glass beads which are optionally treated with an organic compound, for example of silane type, as described, for example, in the documents RU 2267004 or RU 2313559. In this case, the cement/beads ratio by weight ranges from 1:0.2 to 1:1. This embodiment is particularly advantageous for the concretes intended for drilling applications in order to make possible good adhesion with the structures of rocks and wells and an improvement in the resistance to perforation.

According to the process of the invention, the content of carbon-based nanofillers ranges from 0.0001% to 0.02% (1 to 200 ppm) by weight, preferably from 0.0005% to 0.01% (5 to 100 ppm) by weight, with respect to the curable inorganic system, more preferably from 0.0005% to 0.005% (5 to 50 ppm), and the water/curable inorganic system ratio by weight is between 0.2 and 1.5, preferably between 0.2 and 0.7, and preferably from 1 to 1.5 in the particular case of concretes intended to be injected. In these systems, the content of superplasticizer is between 0.1% and 1.5% by weight, preferably between 0.2% and 1% by weight, with respect to the cement.

The composite materials based on curable inorganic systems obtained following the process according to the invention exhibit improved properties related to the presence of carbon-based nanofillers: increase in the compressive strength, increase in the bending strength, decrease in the endogenous shrinkage, increase in the resistance to cold and to temperature differences, and acceleration in the hydration of the cement.

According to the invention, the use of a master batch comprising carbon-based nanofillers in a superplasticizer matrix simplifies the method of direct introduction of the carbon-based nanofillers.

Thus, the process according to the invention is particularly well suited to the preparation of denser and mechanically reinforced concretes, the preparation of cellular concrete or the preparation of plasters.

According to the invention, the use of carbon-based nanofillers in the form of a master batch in a superplasticizer makes it possible to significantly improve the resistance to freezing and the diffusion of liquid of curable inorganic systems, such as concretes, to improve the adhesion between the concrete and metal or nonmetal reinforcements or reinforcers in the form of mineral fibers or reinforcers based on polymers in structural construction products, and/or to reduce the phenomena of microcracking due to the various stresses in structural construction products.

The composite materials based on the curable inorganic systems obtained according to the invention are intended for the fields of construction and building, for preparing mortars for bricklaying or interior and exterior coatings or for manufacturing structural construction products, but also for the field of the oil industry, for drilling applications.

The invention will now be illustrated by the following examples, which do not have the purpose of limiting the scope of the invention, defined by the appended claims. In the examples, the percentages are percentages by weight.

EXPERIMENTAL PART

Example 1

Preparation of a Solid Concentrated Master Batch According to the Invention

Carbon nanotubes CNTs (Graphistrength® C100 Arkema) were introduced into the first feed hopper of a Buss® MDK 46 co-kneader (L/D=11), equipped with a recovery extrusion screw and with a granulation device.

A 25% aqueous solution of acrylic polymer (XP 1824 from Coatex) additivated with 1% of NaOH was injected in the liquid form at 40° C. into the $1^{st}$ zone of the co-kneader. The set temperature values and the flow rate within the co-kneader were as follows: Zone 1: 40° C.; Zone 2: 40° C.; Screw: 30° C.; Flow rate: 15 kg/h.

A master batch in the solid form comprising 20% by weight of CNTs was obtained, in which the CNT aggregates are well dispersed in the XP 1824 superplasticizer.

Example 2

Preparation of a Master Batch in the Pasty Composition Form According to the Invention The master batch obtained in example 1 and a polyether polycarboxylate sodium salt in aqueous solution (Ethacryl® HF) were used to prepare a dispersion in aqueous solution comprising:

| | |
|---|---|
| CNTs | 2.5% |
| Ethacryl HF/XP 1824 mixture, dry | 37.48% |
| NaOH | 0.12% |
| Water | 59.9%, |

CNTs/Ethacryl HF, dry, ratio=0.071

For this, the master batch (125 g) was gradually added to 875 g of Ethacryl HF (40% aqueous solution) in a deflocculator (70 mm paddles) and the mixture was subjected to stirring (1550 rpm) for 3 hours.

The dispersion obtained, comprising particles with a size of the order of 100 μm, was then subjected to a treatment in a bead mill with a horizontal chamber (Dispermat SL-M25).

The parameters used are:

250 ml chamber filled with 200 ml of 1.2-1.7 mm ceramic beads,

Back pressure chamber: 240 ml water

Speed 4000 rpm/pump 42%/750 W (power measured)/14.2 m/s/2.5 Nm

Cooling of the chambers of the bead mill with water from the distribution network (20° C.)

Splayed circulation of the product for 10 mn.

Approximately 800 g of a pasty composition comprising 2.5% of CNTs not exhibiting particles with a size of greater than 10 μm were recovered.

The bead mill was cleaned and rinsed by splayed circulation with water until the water was clear.

Example 3

Preparation of a Master Batch in the Pasty Composition Form According to the Invention The master batch obtained in example 1 and a dispersing agent in aqueous solution (Tego 750 W) were used to directly prepare the pasty composition comprising 2.5% of CNTs. The dispersion was obtained from:

| | |
|---|---|
| Tego 750 W (dry content of 40%) | 110 parts |
| Master batch of example 1 | 20 parts |
| Water | 30 parts |

The dispersion was produced in a deflocculator comprising 70 mm paddles over 3 hours.

After 3 hours, the dispersion foams slightly and the Kreps viscosity, measured using a Lamy Rheology viscometer (measured at 30 seconds at 200 rev/min), is 90 KU (i.e. 1200 mPa·s) at 20° C. At t+1 day after the dispersion, the dispersion has completely defoamed and the viscosity measured is 64 KU (i.e. 390 mPa·s) at 20° C.

The paste thus prepared can be easily used to dope a superplasticizer.

Example 4

Preparation of a Master Batch in the Pasty Composition Form According to the Invention In this example, a pasty composition was directly prepared by dispersing CNTs in a superplasticizer using a bead mill according to the following procedure:

In a 2 liter vessel:
Introduction of
625 g of Ethacryl HF (40% dry)
350 g of water
25 g of Graphistrength C100 CNTs, weighed under a hood suitable for the weighing of CNTs;
Predispersion in the mixer comprising 70 mm paddles for 2 to 3 hours with stirring at 1500 rpm;
Transfer of this predispersion to the bead mill;
Monitoring of the quality of dispersion with a North bar (particles <10 μm) and visual observation between slide-cover glass after dilution to 1% CNTs equivalent.

The dispersion is correct at the mill outlet from the first pass; approximately 800 g of paste comprising 2.5% of CNTs dispersed in the Ethacryl HF were recovered.

Example 5

Incorporation of CNTs in a Reference Concrete Based on Portland Cement

The pasty composition comprising 2.5% of CNTs obtained in example 2 was introduced into commercial Ethacryl HF with stirring in a mixer of deflocculator type (400 revolutions per minute at ambient temperature for several minutes), so as to dope the superplasticizer with 0.25% of CNTs. A doped superplasticizer comprising 0.25% of CNTs is obtained which is a homogeneous and stable viscous liquid.

The doped superplasticizer can be used directly in the preparation of concrete.

A concrete was prepared from 450 g of cement of CEM II type, index 32.5, mixed with 1350 g of quartz sand (proportion 1:3 by weight).

4.5 g of Ethacryl HF doped with 0.25% of CNTs were introduced into 160 g of water.

The mixing of the cement/sand with the water additivated with doped Ethacryl HF is carried out directly in the cement mixer for 3 minutes. The water/cement ratio is 0.36. The doped Ethacryl HF/cement ratio is 1%. The CNTs content in the cement is 25 ppm.

A concrete such that the doped Ethacryl HF/cement ratio is 0.2% and the CNTs content in the cement is 5 ppm was prepared according to the same procedure.

Comparative concretes were prepared using nondoped commercial Ethacryl HF.

Each concrete thus prepared was placed in preforms having dimensions of 40×40×160 mm densified over a vibrating table for 3 min. The concrete was then stored in the preforms at 20° C. and with a relative humidity of 100% for 24 hours.

Subsequently, the samples were taken out of the preforms and they were conditioned under the same conditions for 27 days.

Mechanical tests in compression and in bending were carried out on these samples on the $28^{th}$ day of conditioning, according to the following method: GOST 310.4-81 ("Cements. Methods of bending and compression strength determination").

Figure 1:
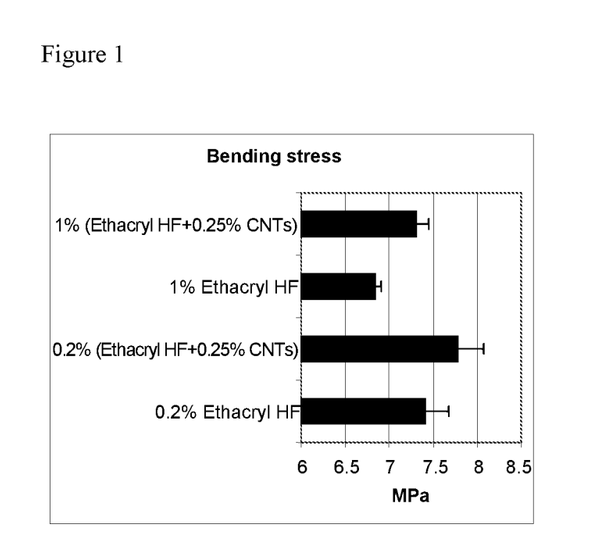
FIG. 1 represents the bending strength of the concrete (expressed in MPa), shows the improvement in this property when a superplasticizer doped with 0.25% of CNTs is used, in comparison with the commercial superplasticizer.
Figure 2:
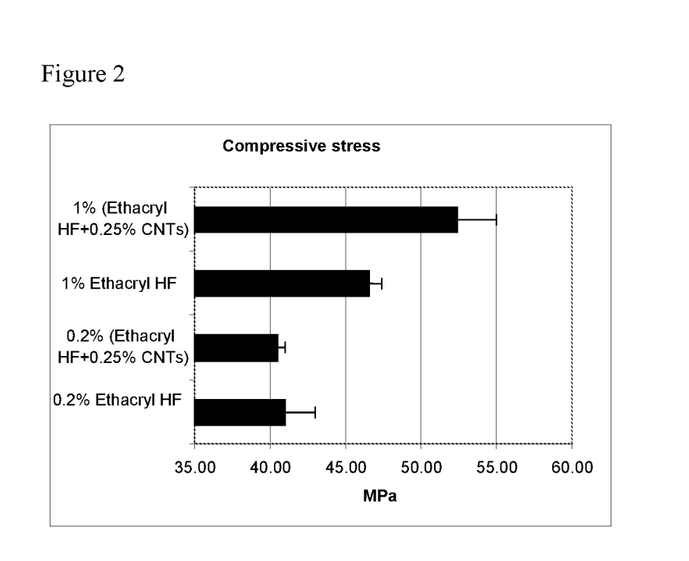
FIG. 2 represents the compressive strength of the concrete (expressed in MPa), shows the improvement in this property when a superplasticizer doped with 0.25% of CNTs is used, in comparison with the commercial superplasticizer.

The results are given in graphical form in FIGS. 1 and 2.

FIG. 1, which represents the bending strength of the concrete (expressed in MPa), shows the improvement in this property when a superplasticizer doped with 0.25% of CNTs is used, in comparison with the commercial superplasticizer. With 0.2% of doped Ethacryl, representing the addition of 5 ppm of CNTs with respect to the cement, the bending stress is greater than that obtained with 1% of commercial Ethacryl HF.

FIG. 2, which represents the compressive strength of the concrete (expressed in MPa), shows the improvement in this property when a superplasticizer doped with 0.25% of CNTs is used, in comparison with the commercial superplasticizer. With 25 ppm of CNTs in the cement introduced by the doped superplasticizer, an improvement of more than 10% is obtained for the compressive stress.

Embodiments

1. A process for the preparation of a master batch comprising at least one superplasticizer and from 0.1% to 25% by weight of carbon-based nanofillers, expressed with respect to the total weight of the master batch, comprising:

(i) the introduction into a kneader and then the kneading of carbon-based nanofillers and of at least one superplasticizer, optionally in the presence of a water-soluble dispersing agent, in order to form a homogeneous mixture in the solid form or in the pasty composition form;

(ii) the extrusion of said mixture in the solid form in order to obtain a master batch in the solid form;

(iii) optionally the dispersion of said master batch in the solid form in a superplasticizer identical to or different from that of stage (i), or in a water-soluble dispersant, in order to obtain a master batch in the form of a pasty composition;

(iv) optionally the introduction of the master batch in the form of a pasty composition obtained in stage (i) or in stage (iii), into a superplasticizer which is identical to or different from that of stage (i) or that of stage (iii), in order to obtain a master batch having a low content of carbon-based nanofillers.

2. The process as in embodiment 1, characterized in that the carbon-based nanofillers are carbon nanotubes, alone or as a mixture with graphenes.

3. The process as in embodiment 1 or 2, characterized in that the superplasticizer is chosen from:

sulfonated salts of polycondensates of naphthalene and formaldehyde, commonly known as polynaphthalenesulfonates or naphthalene-based superplasticizers;

sulfonated salts of polycondensates of melamine and formaldehyde, commonly known as melamine-based superplasticizers;

lignosulfonates having very low sugar contents;

polyacrylates;

products based on polycarboxylic acids, in particular polyether polycarboxylate salts;

and their corresponding aqueous solutions.

4. The process as in any one of the preceding embodiments, characterized in that the water-soluble dispersant is noncovalently bonded to the carbon-based nanofillers and is chosen from essentially nonionic surfactants, such as:

(i) esters of polyols, in particular:
   esters of fatty acid and of sorbitan, which are optionally polyethoxylated,
   esters of fatty acids and of glycerol,
   esters of fatty acids and of sucrose,
   esters of fatty acids and of polyethylene glycol,
(ii) polysiloxanes modified by polyethers,
(iii) ethers of fatty alcohols and of polyethylene glycol,
(iv) alkyl polyglycosides, and
(v) polyethylene/polyethylene glycol block copolymers.

5. The process as in any one of the preceding embodiments, characterized in that stage (i) results directly in the preparation of a master batch in the form of a pasty composition.

6. The process as in any one of the preceding embodiments, characterized in that stage (iii) is carried out using a water-soluble dispersant.

7. The process as in any one of the preceding embodiments, characterized in that the superplasticizer is identical in all the stages.

8. A master batch comprising at least one superplasticizer and carbon-based nanofillers at a content by weight of between 0.1% and 25%, preferably between 0.2% and 20%, with respect to the total weight of the master batch, capable of being obtained according to the process as in any one of the preceding embodiments.

9. The master batch as in embodiment 8, characterized in that it comprises from 0.1% to 1% by weight of carbon-based nanofillers, with respect to the total weight of the master batch.

10. The master batch as in embodiment 8 or 9, characterized in that it comprises a water-soluble dispersant.

11. A process for the introduction of carbon-based nanofillers into a curable inorganic system, comprising at least the stage of introduction of water and of a master batch as in any one of embodiments 8 to 10, separately or as a mixture, into a kneading appliance comprising at least one curable inorganic system, in order to ensure a content of carbon-based nanofillers ranging from 0.0001% to 0.02% by weight, preferably from 0.0005% to 0.01% by weight, with respect to the curable inorganic system, and a water/curable inorganic system ratio by weight ranging from 0.2 to 1.5 and preferably from 0.2 to 0.7.

12. The process as in embodiment 11, characterized in that the curable inorganic system is a cement base, as described in the standard EN-197-1-2000, in particular Portland-type cement, composite Portland cement, for example with limestone, with slag, with fly ash, with pozzolana, with calcined shale or with silica fume, blast furnace cement, pozzolanic cement, magnesia cement, or other anhydrite-based cement, such as fluoroanhydrite cement, used alone or as a mixture, or gypsum, ordinary lime, a liquid silicate or a ceramic.

13. The process as in embodiment 11 or 12, characterized in that the curable inorganic system is a cement, optionally mixed with a material such as sand or hollow glass beads.

14. A composite material based on a curable inorganic system capable of being obtained according to the process as in any one of embodiments 11 to 13.

15. The use of the material as in embodiment 14 in the field of construction and building, for preparing mortars for bricklaying or interior and exterior coatings or for manufacturing structural construction products, and in the field of the oil industry, for drilling applications.

16. The use of the master batch as in any one of embodiments 8 to 10, for improving the resistance to freezing and to the diffusion of liquid of a curable inorganic system, such as a cement.

17. The use of the master batch as in any one of embodiments 8 to 10, for improving the adhesion between a curable inorganic system and metal or nonmetal reinforcements or reinforcers in the form of mineral fibers or reinforcers based on polymers in structural construction products.

18. The use of the master batch as in any one of embodiments 8 to 10, for reducing the phenomena of microcracking due to the various stresses in structural construction products.

The invention claimed is:

1. A process for the introduction of fillers into a curable inorganic system, the fillers comprising at least one component selected from the group consisting of carbon nanotubes, carbon nanofibres, and graphene,
the process comprising at least the stage of introduction of water and of a master batch, wherein the water and the master batch are added separately and directly into a kneading appliance comprising at least one curable inorganic system, in order to ensure a content of the fillers ranging from 0.0001% to 0.02% by weight, with respect to the curable inorganic system, and a water/curable inorganic system ratio by weight ranging from 0.2 to 1.5,
wherein the master batch comprises at least one superplasticizer and the fillers at a content by weight of between 0.1% and 25%, with respect to the total weight of the master batch, capable of being obtained according to a process for the preparation of a master batch, comprising:
(i) introduction into a kneader and then kneading of the fillers and of at least one superplasticizer, optionally in the presence of a water-soluble dispersing agent, in order to form a homogeneous mixture in the solid form or in the pasty composition form;
(ii) extrusion of said mixture in the solid form in order to obtain a master batch in the solid form;
(iii) optionally, dispersion of said master batch in the solid form in a superplasticizer identical to or different from that of stage (i), or in a water-soluble dispersant, in order to obtain a master batch in the form of a pasty composition; and
(iv) optionally, introduction of the master batch in the form of a pasty composition obtained in stage (i) or in stage (iii), into a superplasticizer which is identical to or different from that of stage (i) or that of stage (iii), in order to obtain a master batch having a content of the fillers from 0.1 to 2% by weight.

2. The process of claim 1, wherein the curable inorganic system is a cement base, as described in the standard EN-197-1-2000.

3. The process of claim 1, wherein the curable inorganic system is a cement, optionally mixed with a material.

4. The process of claim 3, wherein the material is sand or hollow glass beads.

5. A composite material based on a curable inorganic system capable of being obtained according to the process of claim 1.

6. The process of claim 1, wherein the content of fillers ranges from 0.0005% to 0.01% by weight, with respect to the curable inorganic system.

7. The process of claim 1, wherein the water/curable inorganic system ratio by weight ranges from 0.2 to 0.7.

8. The process of claim 1, wherein the master batch is obtained according to a process for the preparation of a master batch, comprising:
(i) introduction into a kneader and then kneading of the fillers and of at least one superplasticizer, optionally in the presence of a water-soluble dispersing agent, in order to form a homogeneous mixture in the solid form or in the pasty composition form;
(ii) extrusion of said mixture in the solid form in order to obtain a master batch in the solid form;
(iii) optionally, dispersion of said master batch in the solid form in a superplasticizer identical to or different from that of stage (i), or in a water-soluble dispersant, in order to obtain a master batch in the form of a pasty composition; and
(iv) optionally, introduction of the master batch in the form of a pasty composition obtained in stage (i) or in stage (iii), into a superplasticizer which is identical to or different from that of stage (i) or that of stage (iii), in order to obtain a master batch having a content of the fillers from 0.1 to 2% by weight.

9. A method of improving the resistance to freezing and to the diffusion of liquid of a curable inorganic system, the method comprising adding a master batch, for improving the resistance to freezing and to the diffusion of liquid of a curable inorganic system, and water separately and directly into a kneading appliance comprising at least one curable inorganic system, in order to ensure a content of the fillers ranging from 0.0001% to 0.02% by weight, with respect to the curable inorganic system, and a water/curable inorganic system ratio by weight ranging from 0.2 to 1.5
wherein the master batch comprises at least one superplasticizer and fillers, the fillers comprising at least one component selected from the group consisting of carbon nanotubes, carbon nanofibres, and graphene, at a content by weight of between 0.1% and 25%, with respect to the total weight of the master batch, capable of being obtained according to a process for the preparation of a master batch, comprising:
(i) introduction into a kneader and then kneading of the fillers and of at least one superplasticizer, optionally in the presence of a water-soluble dispersing agent, in order to form a homogeneous mixture in the solid form or in the pasty composition form;
(ii) extrusion of said mixture in the solid form in order to obtain a master batch in the solid form;

(iii) optionally, dispersion of said master batch in the solid form in a superplasticizer identical to or different from that of stage (i), or in a water-soluble dispersant, in order to obtain a master batch in the form of a pasty composition; and (iv) optionally, introduction of the master batch in the form of a pasty composition obtained in stage (iii), into a superplasticizer which is identical to or different from that of stage (iii), in order to obtain a master batch having a content of the fillers from 0.1 to 2% by weight.

10. A method of improving the adhesion between a curable inorganic system and metal or nonmetal reinforcements or reinforcers in the form of mineral fibers or reinforcers based on polymers in structural construction products, the method comprising adding a master batch, for improving the adhesion between a curable inorganic system and metal or nonmetal reinforcements or reinforcers in the form of mineral fibers or reinforcers based on polymers in structural construction products, and water separately and directly into a kneading appliance comprising at least one curable inorganic system, in order to ensure a content of the fillers ranging from 0.0001% to 0.02% by weight, with respect to the curable inorganic system, and a water/curable inorganic system ratio by weight ranging from 0.2 to 1.5 wherein the master batch comprises at least one superplasticizer and fillers, the fillers comprising at least one component selected from the group consisting of carbon nanotubes, carbon nanofibres, and graphene, at a content by weight of between 0.1% and 25%, with respect to the total weight of the master batch, capable of being obtained according to a process for the preparation of a master batch, comprising:

(i) introduction directly of the masterbatch into a kneader and then kneading of the fillers and of at least one superplasticizer, optionally in the presence of a water-soluble dispersing agent, in order to form a homogeneous mixture in the solid form or in the pasty composition form;

(ii) extrusion of said mixture in the solid form in order to obtain a master batch in the solid form;

(iii) optionally, dispersion of said master batch in the solid form in a superplasticizer identical to or different from that of stage (i), or in a water-soluble dispersant, in order to obtain a master batch in the form of a pasty composition; and (iv) optionally, introduction of the master batch in the form of a pasty composition obtained in stage (iii), into a superplasticizer which is identical to or different from that of stage (iii), in order to obtain a master batch having a content of the fillers from 0.1 to 2% by weight.

11. A method of reducing the phenomena of microcracking due to the various stresses in structural construction products, the method comprising adding a master batch, for reducing the phenomena of microcracking due to the various stresses in structural construction products, and water separately and directly into a kneading appliance comprising at least one curable inorganic system, in order to ensure a content of the fillers ranging from 0.0001% to 0.02% by weight, with respect to the curable inorganic system, and a water/curable inorganic system ratio by weight ranging from 0.2 to 1.5 wherein the master batch comprises at least one superplasticizer and fillers, the fillers comprising at least one component selected from the group consisting of carbon nanotubes, carbon nanofibres, and graphene, at a content by weight of between 0.1% and 25%, with respect to the total weight of the master batch, capable of being obtained according to a process for the preparation of a master batch, comprising:

(i) introduction into a kneader and then kneading of the fillers and of at least one superplasticizer, optionally in the presence of a water-soluble dispersing agent, in order to form a homogeneous mixture in the solid form or in the pasty composition form;

(ii) extrusion of said mixture in the solid form in order to obtain a master batch in the solid form;

(iii) optionally, dispersion of said master batch in the solid form in a superplasticizer identical to or different from that of stage (i), or in a water-soluble dispersant, in order to obtain a master batch in the form of a pasty composition; and (iv) optionally, introduction of the master batch in the form of a pasty composition obtained in stage (iii), into a superplasticizer which is identical to or different from that of stage (iii), in order to obtain a master batch having a content of the fillers from 0.1 to 2% by weight.

* * * * *